US012476947B2

(12) United States Patent
Parla et al.

(10) Patent No.: US 12,476,947 B2
(45) Date of Patent: Nov. 18, 2025

(54) WIRE-SPEED ROUTING AND POLICY ENFORCEMENT WITHOUT DPI OR DECRYPTION

(71) Applicant: Cisco Technology, Inc., San Jose, CA (US)

(72) Inventors: Vincent Parla, North Hampton, NH (US); Kyle Andrew Donald Mestery, Woodbury, MN (US); Rahim Lalani, Vancouver (CA); Scott Roy Fluhrer, North Attleboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 17/491,163

(22) Filed: Sep. 30, 2021

(65) Prior Publication Data

US 2023/0097734 A1 Mar. 30, 2023

(51) Int. Cl.
*H04L 29/06* (2006.01)
*H04L 9/40* (2022.01)

(52) U.S. Cl.
CPC ...... *H04L 63/0485* (2013.01); *H04L 63/0236* (2013.01); *H04L 63/166* (2013.01)

(58) Field of Classification Search
USPC ........................................................ 713/151
See application file for complete search history.

(56) References Cited

U.S. PATENT DOCUMENTS

| | | | |
|---|---|---|---|
| 10,979,402 B1 * | 4/2021 | Hartley | H04L 49/201 |
| 2004/0139313 A1 | 7/2004 | Buer et al. | |
| 2014/0064261 A1 * | 3/2014 | Wang | H04W 40/02 370/338 |
| 2014/0282843 A1 * | 9/2014 | Buruganahalli | H04L 63/0428 726/1 |
| 2020/0059457 A1 | 2/2020 | Raza et al. | |
| 2020/0304477 A1 * | 9/2020 | Venkataraman | H04L 12/4633 |
| 2021/0144075 A1 | 5/2021 | Indiresan et al. | |
| 2022/0407625 A1 * | 12/2022 | Radi | H04L 1/1678 |

FOREIGN PATENT DOCUMENTS

WO 2019125290 6/2019

* cited by examiner

*Primary Examiner* — Sanchit K Sarker
(74) *Attorney, Agent, or Firm* — Polsinelli P.C.

(57) ABSTRACT

A system and computer-implemented method for routing an encrypted packet through a cloud enforcement network based on a metadata tag. The cloud enforcement network applies policy and routing attributions or tags outside of the encrypted packet payload in such a way as to not require an inner packet to first be decrypted. Traffic prioritization, data protection, and per application policies are achieved by using such metadata tags for internode routing without the need for DPI or decryption. Furthermore, the metadata itself can also be signed or encrypted depending on the provenance of the data. As such, applying meta-tagging external to an encrypted packet, the payload would not be needed to be decrypted during transit of the packet to express end-to-end policy and routing decisions.

10 Claims, 11 Drawing Sheets

WIRE-SPEED ROUTING AND POLICY ENFORCEMENT WITHOUT DPI OR DECRYPTION

TECHNICAL FIELD

The present disclosure relates generally to data security, and more specifically to decryption operations for applying policy and routing decisions.

BACKGROUND

Policy and routing for traffic in a network provide various advantages. Policy context may be, for example, for security reasons with preventing unauthorized access, modification, or disclosure of information, or for optimal path routing in a cloud network. A security policy may enforce traffic rules, identify threats and vulnerabilities, and provide access controls. In particular, security policies may require decryption of traffic in order to be applied, which may constitute an invasion of privacy of an end-user. Furthermore, performing decryption of traffic can negatively impact network performance.

Cloud solutions often need to perform one or more decryption operations on a portion (or entire) packet to process external traffic for routing or policy decisions. Data decryption is both costly in terms of computational operations as well as potentially exposing customer data within a cloud infrastructure in an unencrypted form.

DETAILED DESCRIPTION

Figure 1:
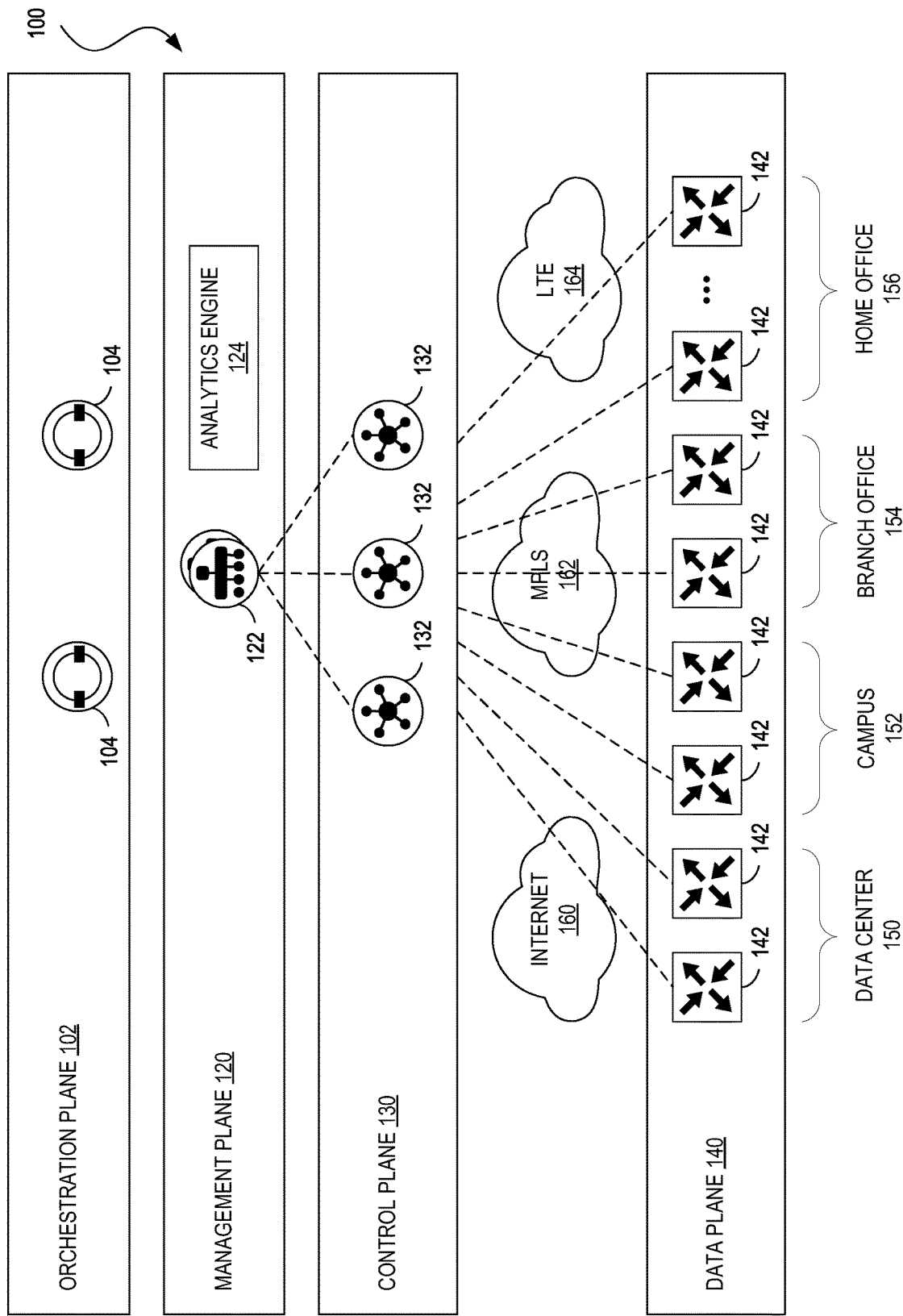
FIG. 1 illustrates an example of a high-level network architecture in accordance with some aspects of this disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Overview

Disclosed are systems, apparatuses, methods, computer readable medium, and circuits for applying a metadata tag externally to a packet that is then encrypted. According to at least one example, a method may include determining routing information regarding a packet at an endpoint. The method may further include creating a metadata tag for the packet. In one example, the metadata tag may be associated with routing of the packet. The method may further include encrypting the packet. The method may also include applying the metadata tag to an outer header of the encrypted packet and an indicator to the encrypted packet. In some examples, the indicator may prevent further decryption and inspection in nodes downstream. The method may further include forwarding the encrypted packet via a network based on the metadata tag. For example, the device name may determine routing information regarding a packet at an endpoint. The method may further include creating a metadata tag for the packet. The metadata tag may be associated with routing of the packet. The metadata tag may be applied tag to an outer header of the encrypted packet and an indicator to the encrypted packet. In some examples, the indicator may prevent further decryption and inspection in nodes downstream. The encrypted packet may be forwarded via a network based on the metadata tag.

In some examples, the method may include receiving a second encrypted packet with a second metadata tag, the second encrypted packet being an additional encrypted packet. The method may further include applying an enforcement policy to the second encrypted packet based on the second metadata tag. The method may also include blocking or further routing the second encrypted packet to a second cloud enforcement node without decrypting the second encrypted packet based on the applied enforcement policy. In some examples, the metadata tag may include contextual information for routing and policy decisions. The contextual information may include at least one of a user, a group tag that the user is a part of, a data center tag associated with a data center that the encrypted packet is being routed, and a virtual network identifier. In some examples, the method may include determining, based on the group tag, that the encrypted packet is limited to a particular route. The method may further include performing segmentation of the network, whereby the encrypted packet is limited to the route in associated data centers.

In another example, a device for applying a metadata tag externally to a packet that is then encrypted is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the device to determine routing information regarding a packet at an endpoint. The device may further be caused to create a metadata tag for the packet. The metadata tag may be associated with routing of the packet. The device may further be caused to encrypt the packet. Additionally, the device may be caused to apply the metadata tag to an outer header of the encrypted packet and an indicator to the encrypted packet. The indicator may prevent further decryption and inspection in nodes downstream; forward the encrypted packet via a network based on the metadata tag.

Disclosed are systems, apparatuses, methods, computer readable medium, and circuits for device function. According to at least one example, a method includes: decrypting a part of a received encrypted packet to determine routing information; creating a metadata tag for the encrypted packet using the decrypted part, wherein the metadata tag is associated with routing of the encrypted packet; applying the metadata tag externally to the encrypted packet and an indicator to the encrypted packet to prevent further decryption and inspection in nodes downstream; routing the encrypted packet through a network based on the metadata tag. For example, the device decrypts a part of a received encrypted packet to determine routs information; creates a metadata tag for the encrypted packet using the decrypted part, wherein the metadata tag is associated with routing of the encrypted packet; applies the metadata tag externally to the encrypted packet and an indicator to the encrypted packet to prevent further decryption and inspection in nodes downstream; routs the encrypted packet through a network based on the metadata tag.

In some examples, the method further includes encrypting the metadata tag with a different encryption protocol from an encryption protocol used to encrypt at least a part of the received payload. The method may also include determining that the encrypted packet is to be routed external to the network, whereby the determination causes headers, including the metadata tag, to be encapsulated in an outer protocol encapsulation, the encrypted packet to be encrypted in an inner protocol encapsulation. The outer protocol encapsulation may be via an outer (D)TLS tunnel header in a (D)TLS encapsulation, encapsulating part of a IPsec payload. As another example, it can be an IPsec encapsulating part of a TLS tunnel protocol. IPsec, (D)TLS, WireGuard, L2TP or any other tunneling protocol could be used. For example, the outer protocol encapsulation may be DTLS encapsulation of QUIC (HTTP/3) where only DTLS could be a 'tunnel' in the classic sense of the word or just an encapsulation protocol. QUIC can also be viewed as just a protocol on which HTTP is performed. Also, HTTP/2 over HTTP/2 could be a protocol encapsulation. The metadata concept would equally apply by encapsulating the metadata and only the non-encrypted portion of the inner HTTP/2 inside the outer HTTP/2 protocol via encapsulation. As such, the outer tunnel only encapsulates the inner tunnel protocol to the degree that it protects the metadata tag and unencrypted portion of the inner tunnel protocol. The rest of the payload of the inner tunnel (the encrypted part) is just appended to the end of the encapsulated portion, whereby there is no double encryption of the entire payload.

The method may further include bootstrapping an Internet Key Exchange (IKE) on behalf of a client, whereby the client does not have access to a pre-shared key associated with the IPsec site-to-site and preventing child Security Associations from being decryptable by the network, wherein the inner IPsec tunnel header is not decryptable by the network. Additionally, for example, the method may include applying a different prioritization routing policy to the encrypted packet within a multiplexer IPsec or (D)TLS tunnel to a same IP, without decrypting the encrypted packet. An eXpress Data Path or Extended Berkeley Packet Filter may serve as both a metadata engine that creates and applies the metadata tag at an endpoint and a policy application engine that applies polices set forth in the metadata tag to properly route the encrypted packet without decrypting the encrypted packet at an edge network device.

In another example, a device for applying a metadata tag externally to an encrypted packet is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the device to decrypt a part of a received encrypted packet to determine route information. The device may further be caused to create a metadata tag for the encrypted packet using the decrypted part. The metadata tag may be associated with routing of the encrypted packet. The device may further be caused to apply the metadata tag externally to the encrypted packet and an indicator to the encrypted packet to prevent further decryption and inspection in nodes downstream. The device may further be caused to route the encrypted packet through a network based on the metadata tag.

Description of Example Embodiments

As notes above, decrypting a payload to determine an outcome for that payload is both computationally expensive and it exposes customers to potential lawful-intercept or malicious intercept of their enterprise data without their consent.

The present disclosure addresses these and other issues with a network such as, for example and without limitation, a cloud enforcement network. In some examples, the network can apply policy and routing attributions or tags outside of the encrypted packet payload in such a way as to not require an "inner" packet to first be decrypted. There are many use cases of using metatags for internode routing without the need for DPI or decryption, such as traffic prioritization as well as protecting sensitive data. Furthermore, per application policies could be conveyed via this mechanism without any knowledge of that application or data content in the routing infrastructure. Therefore, there is a need in providing a cloud-based networking solution for reducing the number of decryption operations without sacrificing security.

For example, at an entry node, a packet will be marked with meta-data allowing it to traverse intermediary nodes in the infrastructure and be routed in an optimal manner without the need to further review/inspect and/or process (e.g., decrypt, etc.) the data inside the packet itself. The metadata can allow for on-path intelligence where packets can be directed to an appropriate upstream processing node for further treatment without the need for DPI/decryption. For example, the on-path intelligence may indicate to routine some packet to an introspection node if the policy requires it (e.g., a data lost protection component, for example).

As another example, if a policy to block access to a specific server was desirable, the cloud would generally need to know the site-to-site encryption key(s) and would generally need to decrypt enough bytes in every IPsec payload from the site-to-site VPN to ascertain the inner IP addresses in order to search each packet for a policy match. Conversely, by tagging the packets with metadata includes information regarding routing and certain groups the packet may be associated with, policies for those groups and routing paths can be ascertained and applied without a blind decrypt and search approach described above.

In addition, a routing decision may require access to tuples of a decrypted IPsec packet to determine where to route that traffic. In this example, there might be one of a number of termination nodes that are known a priori: a customer premise IPsec termination device, one or more VPC nodes in a cloud service like Amazon AWS, and/or a termination node to perform additional contextual inspection, such as a SIG gateway. Having to decrypt the payload to determine which of the above three nodes to route traffic to is inefficient in terms of computational infrastructure costs and exposes unnecessary risks to the customer in terms of decrypting their traffic during transit (e.g., and thereby potentially exposing the decrypted data).

Furthermore, the metadata itself can also be signed or encrypted depending on the provenance of the data. For example, in some cases, intracloud metadata may not be further encrypted or signed, whilst metadata on an endpoint device might be encrypted or signed in order to ensure end-to-end integrity of the meta-data fields or to protect the data from unwanted introspection.

Overall, by applying meta-tagging external to (e.g., by applying meta-tagging to an external/outer header/portion) an encrypted packet, the payload would not be needed to be decrypted during transit of the packet to express end-to-end policy and routing decisions.

Example systems and architectures in which aspects of this disclosure may be utilized are described with reference to FIGS. 1-4. Thereafter, example aspects of the present disclosure will be described with reference to FIGS. 5A-5B, 6, 7, and 8A-8B. The disclosure concludes with description of example system and device components that may be utilized as part of the example network structure of the present disclosure in FIG. 9.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPsec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
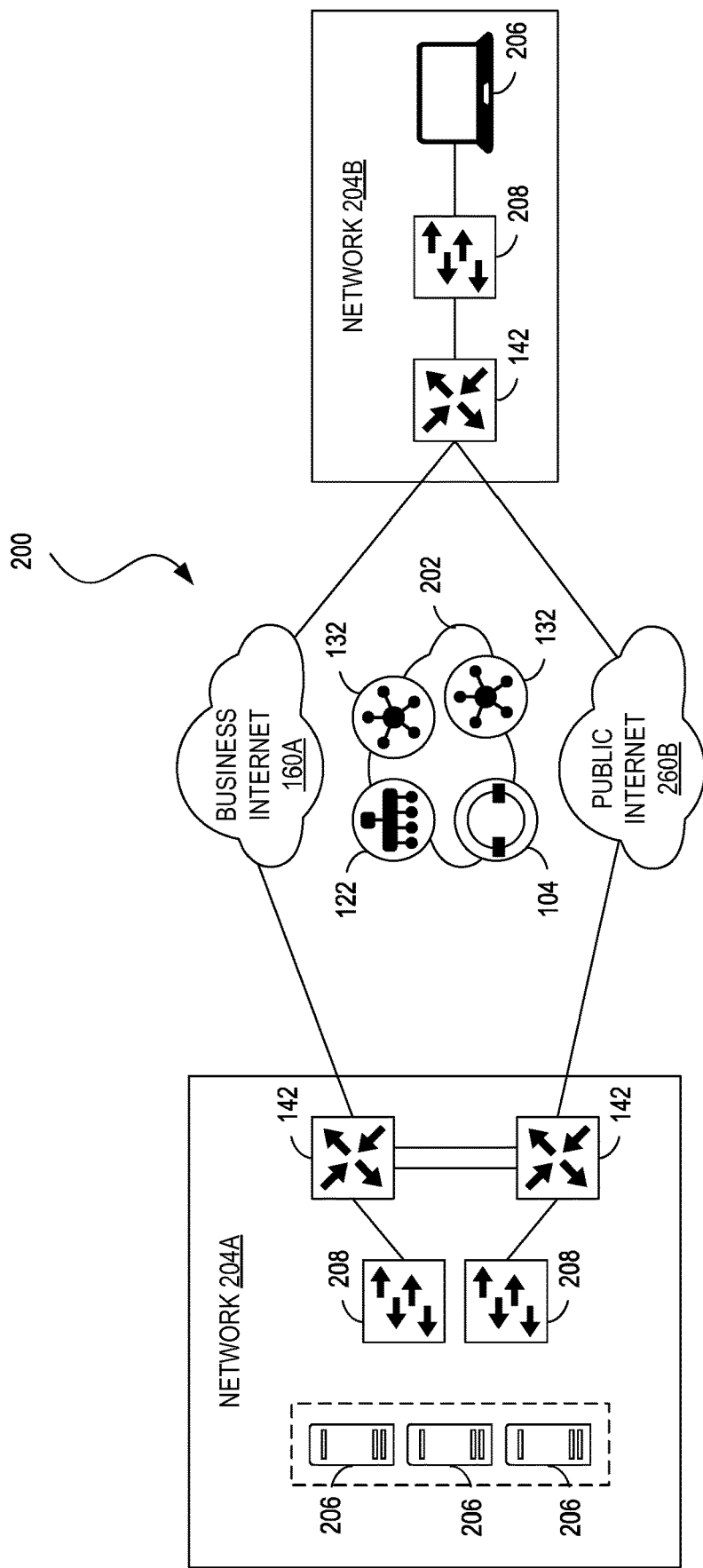
FIG. 2 illustrates an example of a network topology in accordance with some aspects of this disclosure.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security ((D)TLS) or TLS control connection to the network controller appliance(s) 132 and connect to any network control appliance 132 over each transport network 160. In some embodiments, the edge network devices 142 can also securely connect to edge network devices in other sites via IPsec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPsec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
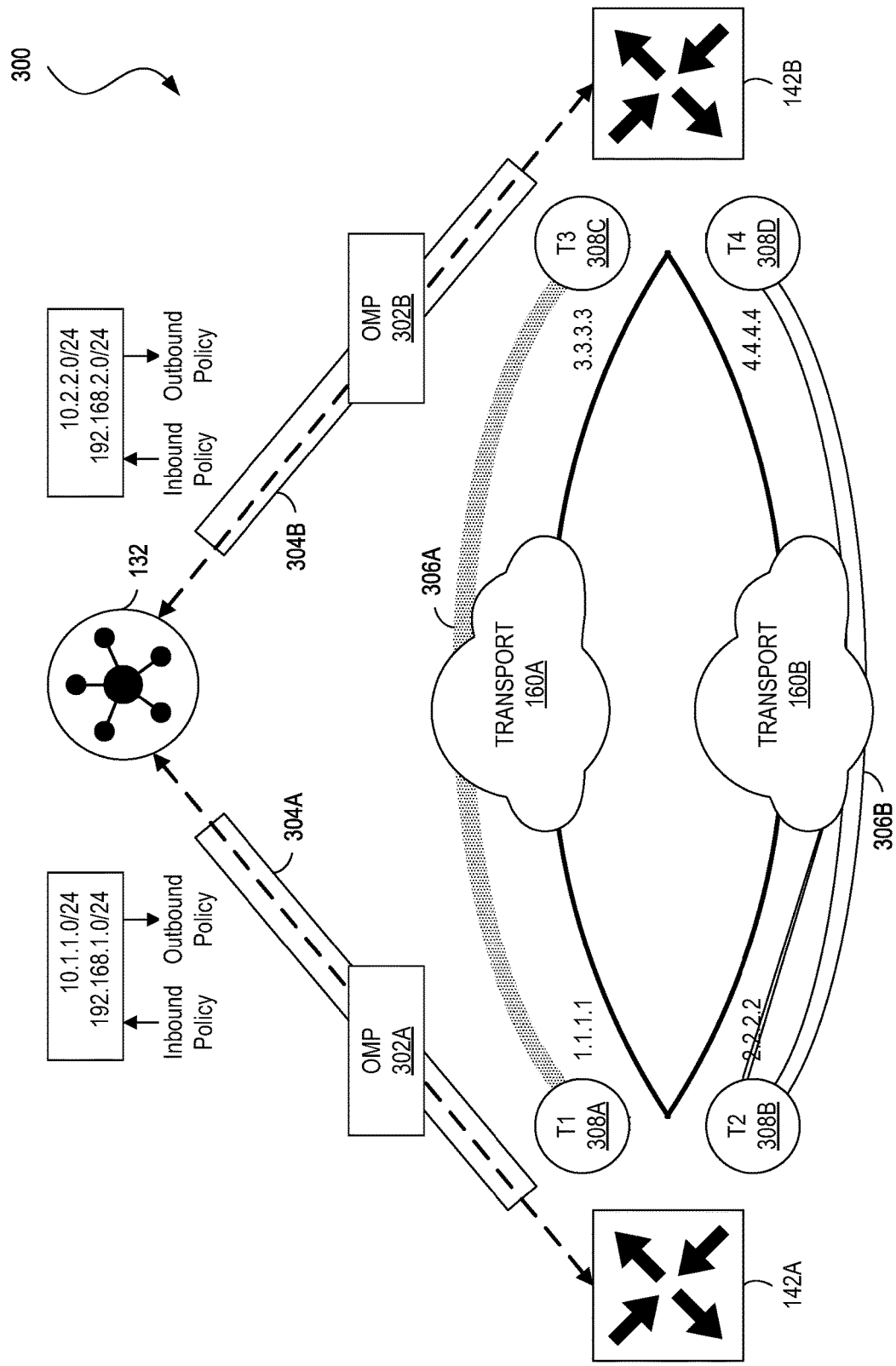
FIG. 3 illustrates an example of a diagram showing the operation of a protocol for managing an overlay network in accordance with some aspects of this disclosure.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure (D)TLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:
- OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.
- TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPsec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.
- Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the (D)TLS/TLS tunnels 304 established between the edge network devices 142 and the network controller appliance 132. In addition, the diagram 300 shows an IPsec tunnel 306A established between TLOC 308A and 308C over the WAN transport network 160A and an IPsec tunnel 306B established between TLOC 308B and TLOC 308D over the WAN transport network 160B. Once the IPsec tunnels 306A and 306B are established, BFD can be enabled across each of them.

Figure 4:
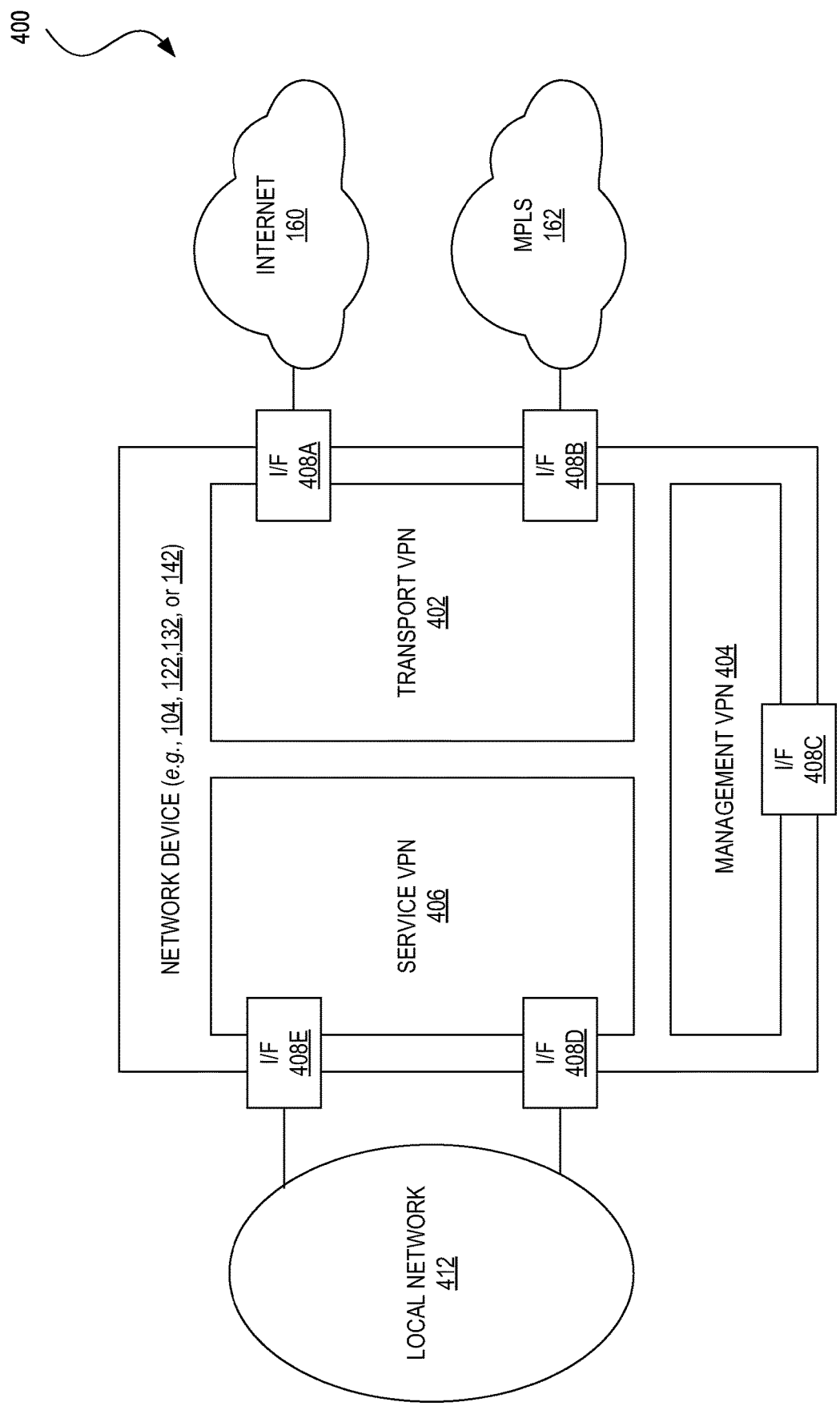
FIG. 4 illustrates an example of a diagram showing the operation of virtual private networks for segmenting a network in accordance with some aspects of this disclosure.

FIG. 4 illustrates an example of a diagram 400 showing the operation of VPNs, which may be used in some aspects of the present disclosure. In some examples, the VPNs can provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 408A and 408B) that respectively connect to WAN transport networks (e.g., the MPLS network 162 and the Internet transport network 160). Secure (D)TLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPsec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 408C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 408D and 408E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPsec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 408A-E (collectively, 408) are shown to be physical interfaces in this example, one of ordinary skill in the art will appreciate that the interfaces 408 in the transport and service VPNs can also be sub-interfaces instead.

Figure 5A:
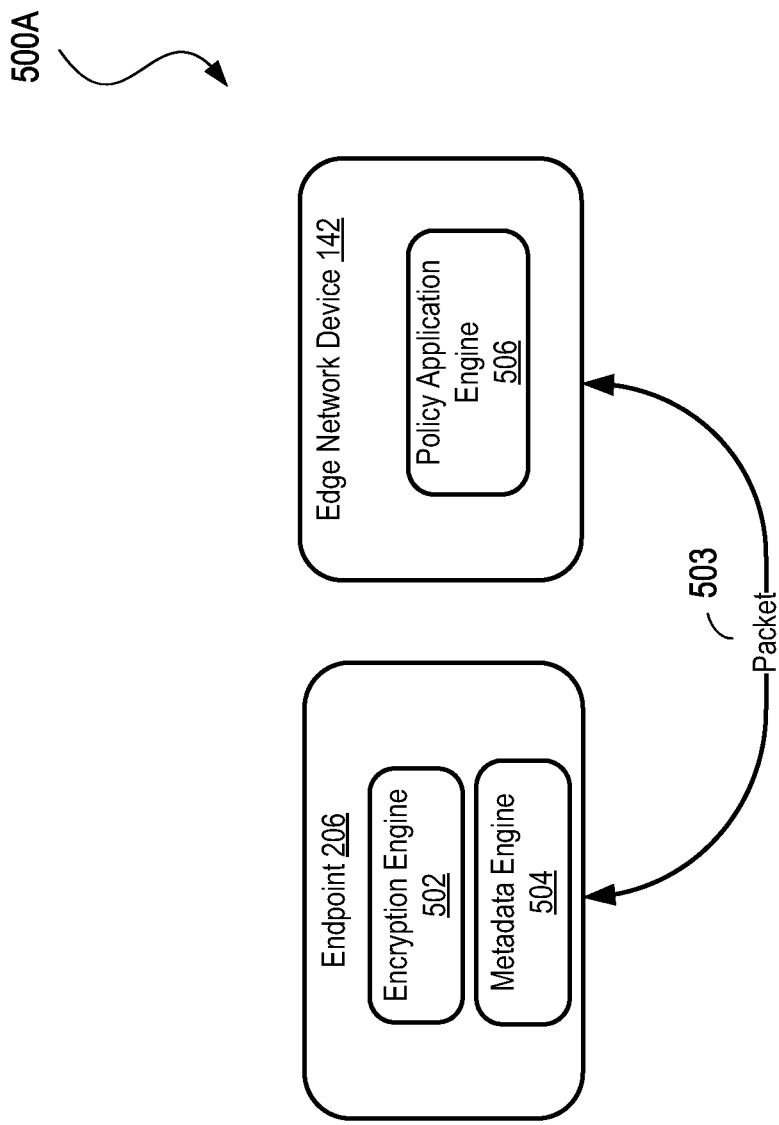
FIG. 5A illustrates an example of a diagram showing an endpoint serving as a packet encryption site as well as a metadata tag site in accordance with some aspects of this disclosure.

FIG. 5A illustrates an example of a diagram 500A showing an endpoint serving as a packet encryption site as well as a metadata tag site in accordance with some aspects of this disclosure. The endpoint 206 may include an encryption engine 502 as well as a metadata engine 504, such as using eXpress Data Path (XDP) or Extended Berkeley Packet Filter (eBPF). XDP or eBPF may also serve as a policy application engine at the edge network device 142.

In an example where the metadata engine 504 is co-located to the encryption engine 502, such as the endpoint 206 in FIG. 2, a packet 503 may be created at the endpoint 206. The packet 503 may be tagged with metadata associated with routing and policies that is extracted from the payload. For example, an outer header (e.g., a Generic UDP (user datagram protocol) Encapsulation (GUE) header or any overlay protocol, such as GENEVE, VXLAN, NVGRE, etc.)) may be placed outside of an encrypted header, as further explained in FIG. 7. The metadata is included in the outer header (e.g., GUE header, etc.). The metadata in the outer header can include, for example and without limitation, contextual information regarding a user, a group tag that the user is a part of, a data center tag associated with a data center that the encrypted packet is being routed, and a virtual network identifier. In some cases, application context or attribution may be added from a perspective of both a client or a server. For example, what browser on the endpoint is this attributed to (e.g. Chrome® v1.2.3)? Or, what server-side application is this attributed to (e.g. Microsoft® Exchange Email Server or Facebook®, etc.)?

In addition, it could be routing information for the encapsulated packet, something like a routing hint. Since the inner packet is encrypted (and cannot be decrypted by our middle box cloud routing), this hinting is very useful in terms of routing the packet once it lands in our cloud. In other cases, the metadata in the outer header can include information such as a data center that the packet is to be routed to or that the packet is tagged with a group tag, which is associated with certain policies. In some examples, the payload of the packet 503 can be encrypted while the metadata (and/or the outer header containing the metadata) can be left unencrypted to allow receiving nodes to read the metadata (and/or the outer header) without decryption. Then, after the packet 503 is encrypted and tagged, the packet 503 may be sent to a next edge network device 142.

The edge network device 142 may include a policy application engine 506, which in some examples may also be using XDP or eBPF. The policy application 506 may determine, based on the metadata tag, such as in the outer header (e.g., the GUE header, etc.), what routing decisions to make and what policies to enforce, if any. For example, the metadata can include, as mentioned above, a group tag that the user is a part of or a data center tag associated with a data center that the encrypted packet is being routed, The policy application 506 can analyze the metadata and determine what routing decisions should apply for the packet based on the group tag. For example, group tag may associate the packet with a security group tag, and packets associated with the security group tag may be used to identify firewall classification. Then, in whatever network the packet 503 is routed through, the packet remains encrypted, using the metadata to properly route the packet 503 and apply any applicable policies.

For example, if a policy was created to mark all browser traffic from an approved version of a browser with a meta-data tag of FF-Advisory Action, the endpoint 206 may mark packets coming from this approved browser with meta-tag of FF-AA. A policy may specify that only packets tagged with FF-AA may be allowed to traverse a particular enterprise network connector (site-to-site VPN path). As a result, packets marked with FF-AA can reach internal sites (e.g., internal.finance_server.mycompany.com), whereas packets not marked with this tag are only allowed to access public facing resources. The cloud routing fabric can act on this policy and block routing of packets not approved by policy to traverse the enterprise network.

As another example, a policy has been expressed to mark all traffic destined for company.com with a meta-data tag of 1234. Now when each endpoint device sends data destined for that address, the packets are tagged with 1234. The cloud policy might be to inspect the first flow from a given endpoint with that meta-data tagging applied. When no issues are found during the initial flow inspection, future packets from that endpoint that contain that meta-data tag are excluded from inspection and are instead fast-pathed to the destination. Policies can be applied on streams of data that might be aggregated into a single IP address. Tunneling or IP Multiplexing (QUIC and other methods) would not be constrained, as each packet can be treated with one or more tags associated with the data.

Figure 5B:
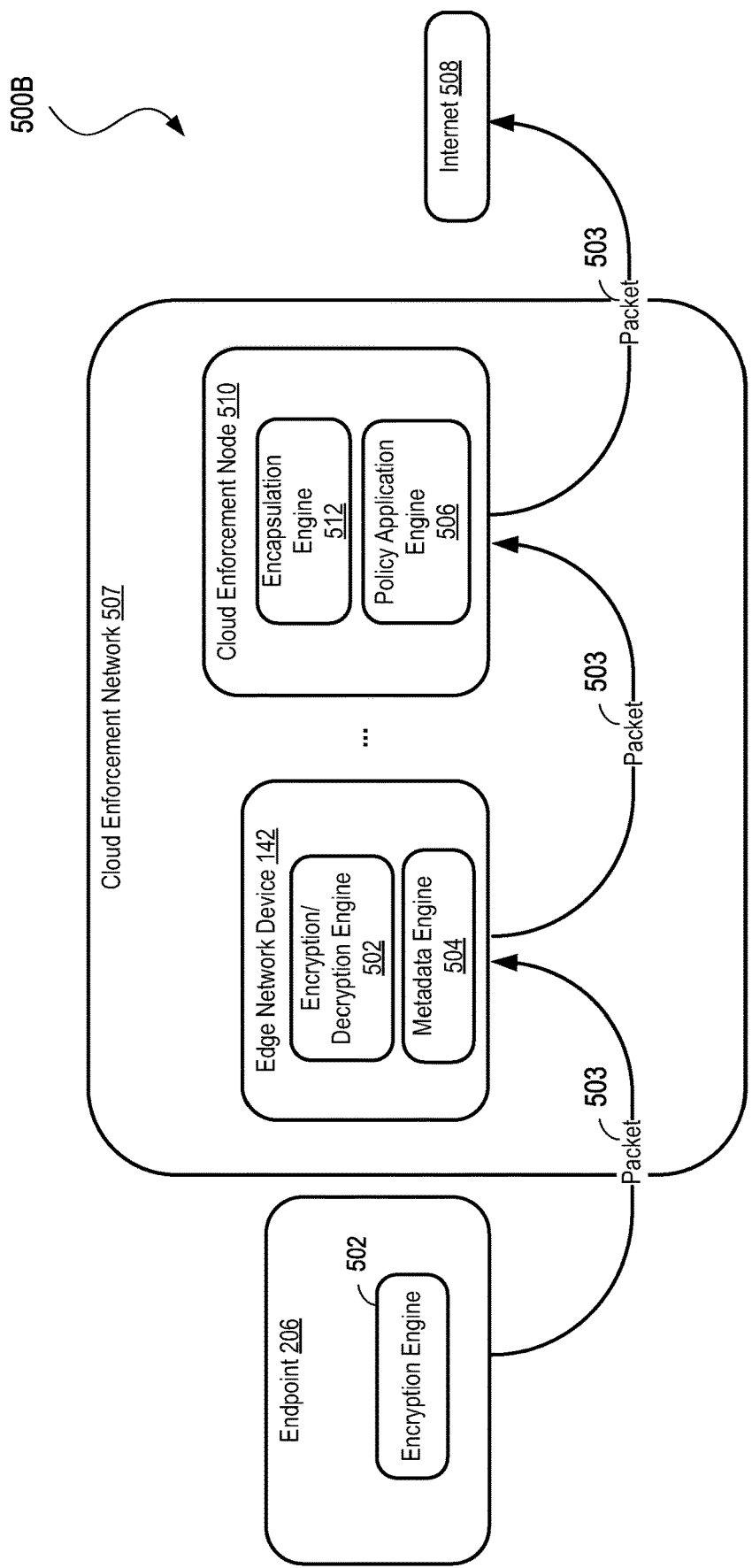
FIG. 5B illustrates an example of a diagram showing an edge network device including an encryption site and a metadata tagging site and a cloud enforcement node with an encapsulation engine in a cloud enforcement network, in accordance with some aspects of this disclosure.

FIG. 5B illustrates an example of a diagram 500B showing an edge network device including an encryption site and a metadata tagging site and a cloud enforcement node with an encapsulation engine 512 in a cloud enforcement network, in accordance with some aspects of this disclosure. When the encryption engine 502 for encrypting the packet 503 is at an endpoint 206 that is not co-located to a metadata engine 504, the packet 503 may need to be decrypted, at least partially, to extract routing and policy information.

First, the packet 502 may be encrypted at the endpoint 206, external to a cloud enforcement network 507. The encrypted packet 503 is then sent to an edge network device 142 in the cloud enforcement network 507. The edge network device 142 can include an encryption/decryption engine 502 and a metadata engine 504. The encrypted packet 503 may be partially decrypted, sufficient to extract the routing and policy information. In some cases, the packet 503 may be fully decrypted for other reasons, such as deep packet inspection or content filtering. Then, after the packet 503 is tagged and any other operations at the endpoint 206 are complete, the packet 503 may be encrypted again and sent to a next edge network device or cloud enforcement node 510, which may represent any node in a chosen path within the cloud enforcement network 507.

Eventually, if the packet 503 is going to leave the cloud enforcement network 507 to a public Internet 508 (or any other network), even the metadata tag in the headers may be encrypted. For example, encrypting the metadata headers ensures that the metadata headers do not get stripped by some intermediate node. While such assurance may be the case without encryption in a cloud enforcement network 507 that is configured to never strip such headers, that may not be the case on the public Internet 508. Moreover, encrypting the metadata headers can protect the information in the metadata headers from prying eyes, since the routing and policy information may be useful information to an attacker.

While it is possible to derive some context based on the IPsec traffic itself that might lend to a routing decision, it would be difficult to know where to potentially route traffic when it may have a per-packet destination that is difficult to deduce simply by an IPsec association directly (e.g., any typical tunneled traffic that needs to be routed based on the contents of that traffic itself). Additionally, applying a policy on a subset of packets multiplexed in the IPsec (or other) tunnel would need the system to decrypt at least enough of the payload to find the inner IPs associated with that flow itself.

As such, in a cloud enforcement node 510 that is a last node before leaving the cloud enforcement network 507, for example, an encapsulation engine 512 may encapsulate the metadata tag. For example, the metadata tag may be encapsulated in an outer Datagram Transport Layer Security ((D)TLS) tunnel header via (D)TLS encapsulation, while the encrypted packet may be encrypted in an inner IPsec tunnel header via IPsec site-to-site. The encrypted packet in the inner IPsec tunnel is stapled to an end of the (D)TLS encapsulation. For example, the encrypted packet in the inner IPsec tunnel can be contained inside or encapsulated by the (D)TLS tunnel header. In some examples, the traffic with the outer (D)TLS tunnel header and the inner IPsec tunnel header may be router over a single (D)TLS tunnel to a single IP address, but each packet may be marked with one or more metadata elements to allow for different treatment of each tunneled packet. In some cases, until the traffic is decrypted (possibly at a customer VPC or on-premise VPN termination device), a next cloud enforcement network not know anything about the actual tunneled/encrypted content itself (e.g., the payload and/or the inner IPsec tunnel header).

Figure 6:
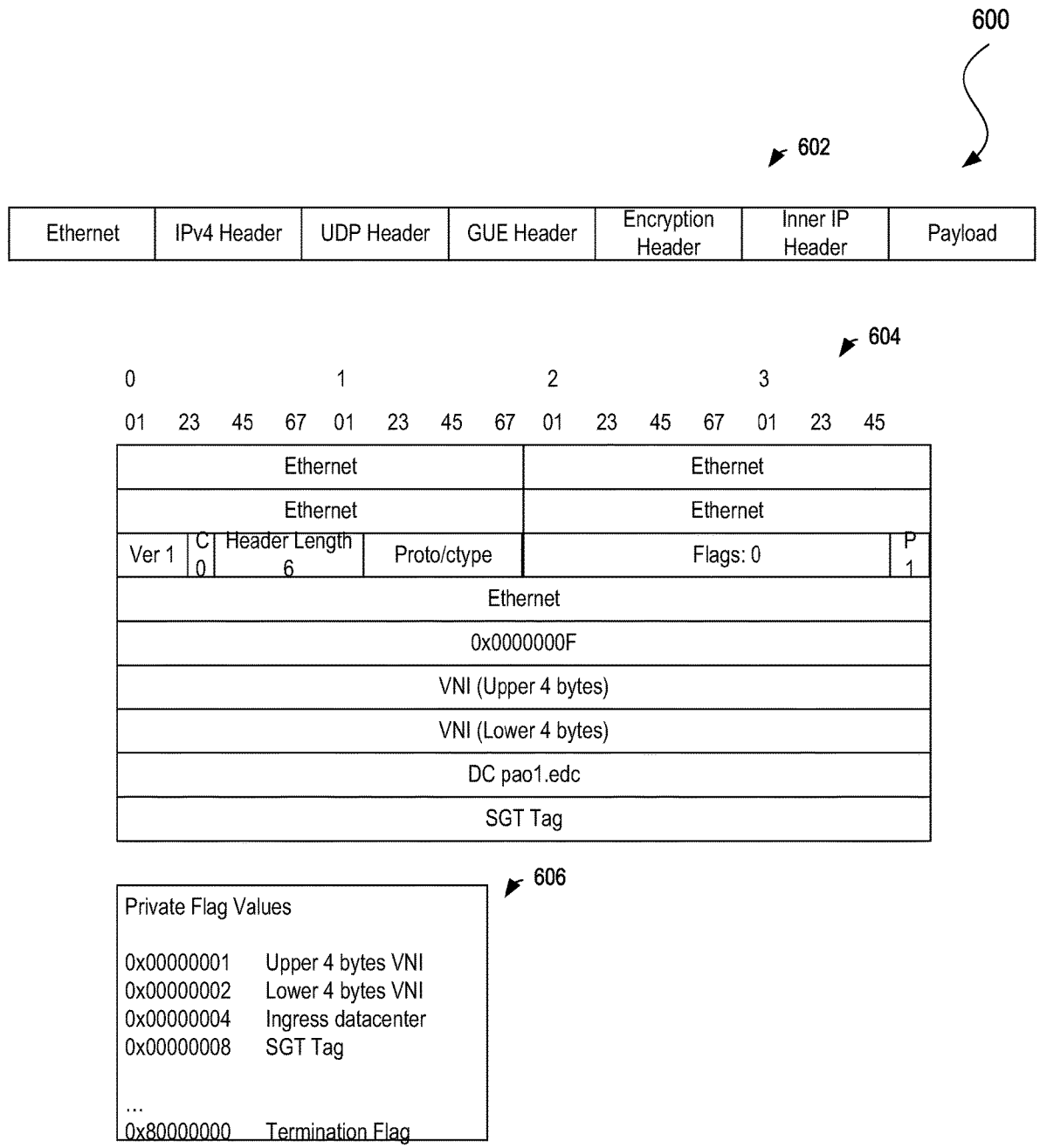
FIG. 6 illustrates an example diagram of header formats of a packet payload in accordance with some aspects of this disclosure.

FIG. 6 illustrates an example diagram 600 of header formats of a packet payload in accordance with some aspects of this disclosure. In some instances of intra-cloud deployment, GRE/GUE/GENEVE headers may serve as an outer protocol with an inner encrypted packet that is end-to-end encrypted, such as using IPsec, Wireguard, or SSL end-to-end encryption. GRE/GUE/GENEVE headers are merely illustrative examples used herein for explanation purposes. Other types/formats of headers are also contemplated herein. FIG. 6 illustrates a packet 602 with a GUE header, followed by an encryption header, then an inner IP header, and lastly the Payload. With the Payload following the Encryption Header, the Payload, along with the Inner IP Header, is encrypted by whatever encryption protocol is used, whereas the GUE Header 604 outside of the Encryption Header is not encrypted.

The GUE Header 604 may provide contextual information for routing and policy decisions. For example, the GUE header 604 may include and/or identify a user, a group tag identifying a group that the user is a part of, a data center tag identifying a network or data center where the encrypted packet is being routed, a virtual network identifier, and/or any other information or combination thereof. For example, the GUE header 604 may include a tag that specifies that the packet is associated with a group and a policy associated with the group specifies that the packet can only traverse a particular route. This may include segmentation of the network with respect to this packet because it's high confidential as an example.

In some examples, the GUE header format can include private flag values 606 which can be used to provide additional metadata. In some cases, the additional metadata may be used to apply a policy for the packet without having to decrypt the packet. Note that the above are merely examples of metadata, and someone skilled in the art would be able to ascertain additional metadata examples which could be used for policy application.

Figure 7:
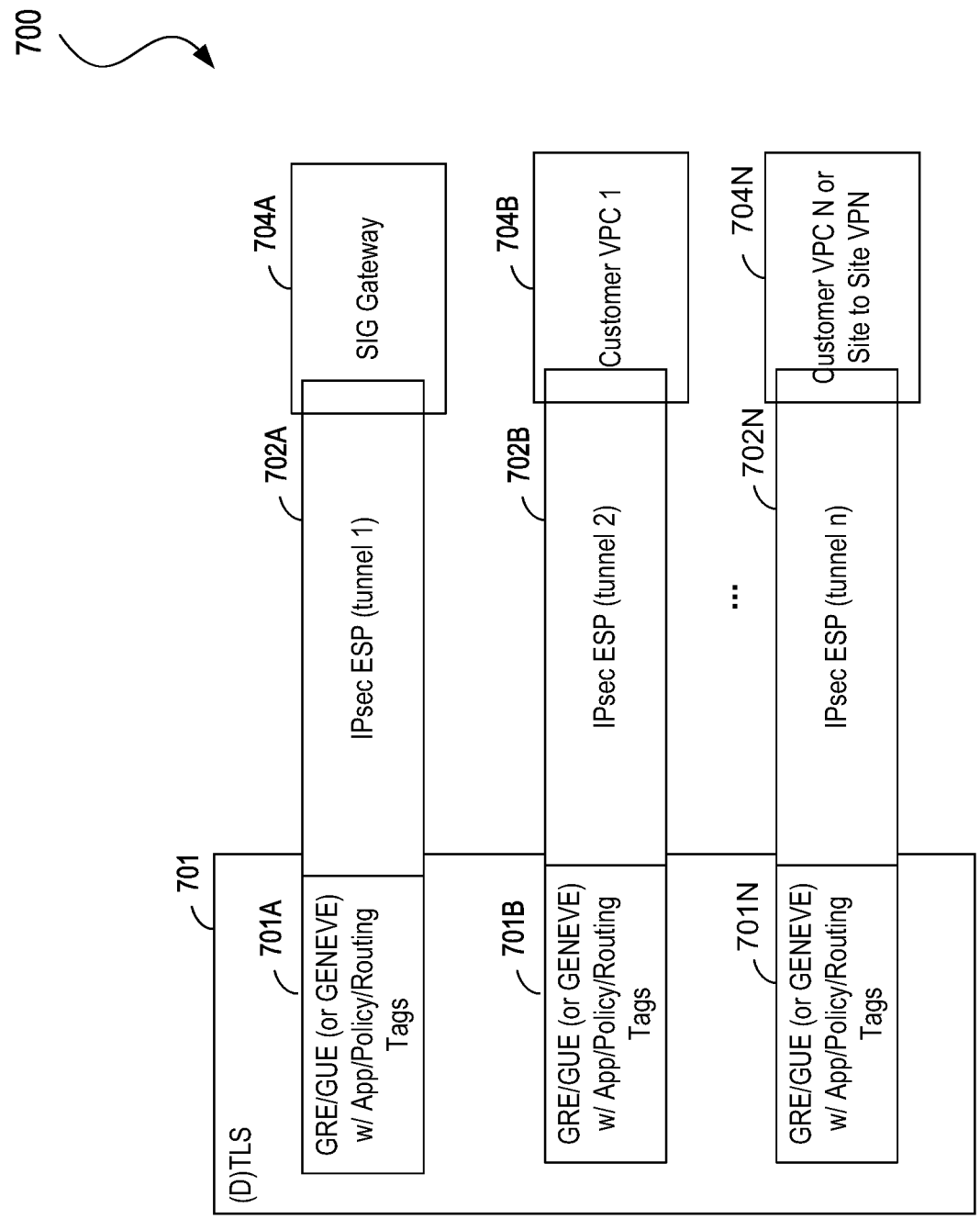
FIG. 7 illustrates an example diagram of IPsec encrypted tunnels with (D)TLS encapsulated headers that include the metadata tags used for routing and policy decisions, in accordance with some aspects of this disclosure.

FIG. 7 illustrates an example diagram 700 of IPsec encrypted tunnels with (D)TLS encapsulated headers that include metadata tags used for routing and policy decisions, in accordance with some aspects of this disclosure. As shown in FIG. 7, there may be multiple encrypted IPsec channels (e.g., 702A, 702B ... 702N) with an outer (D)TLS encapsulation tunnel 701. The header of the IPsec tunnels can include the metadata tags that are encapsulated by the (D)TLS tunnel. The (D)TLS encapsulation tunnel 701 is an example of encapsulation that may be utilized on outer headers, such as GRE, GUE, or GENEVE headers (e.g., 701A, 701B . . . 701N) for example. Cloud and policy routing engines may use the outer headers (e.g., GRE, GUE, or GENEVE headers) for context and steering of the packet. For example, the outer headers may include information such as an indication that the packet is associated with private company traffic and that the packet needs to be routed to the company's private VPC.

Once the packet has been sent via the IPsec tunnel to a termination node 704, which may be for example as shown in FIG. 7, a SIG gateway 704A, a customer VPC 704B, or another customer VPC or site-to-site VPN 704N, the (D)TLS encapsulation may be decrypted to recover the metadata tags. Even so, the customer's data inside the IPsec tunnel is not visible unless decrypted, and only the metadata tag is recovered. The decryption may be performed by Tunnel Termination Device to decrypt just the (D)TLS payload In some examples, the metadata tag may indicate that the packet is company private traffic. In some examples, the metadata tag can indicate that the packet is company should be routed to the company's private VPC and/or a routing domain on the company's network or on-premises site. The packet may be routed and forwarded to the appropriate exit node. In this example, the packet is going to go to the company's site-to-site VPN. Because the packet was traveling over the public Internet, the (D)TLS encapsulation hides the metadata tags from prying users and/or devices.

Figure 8:
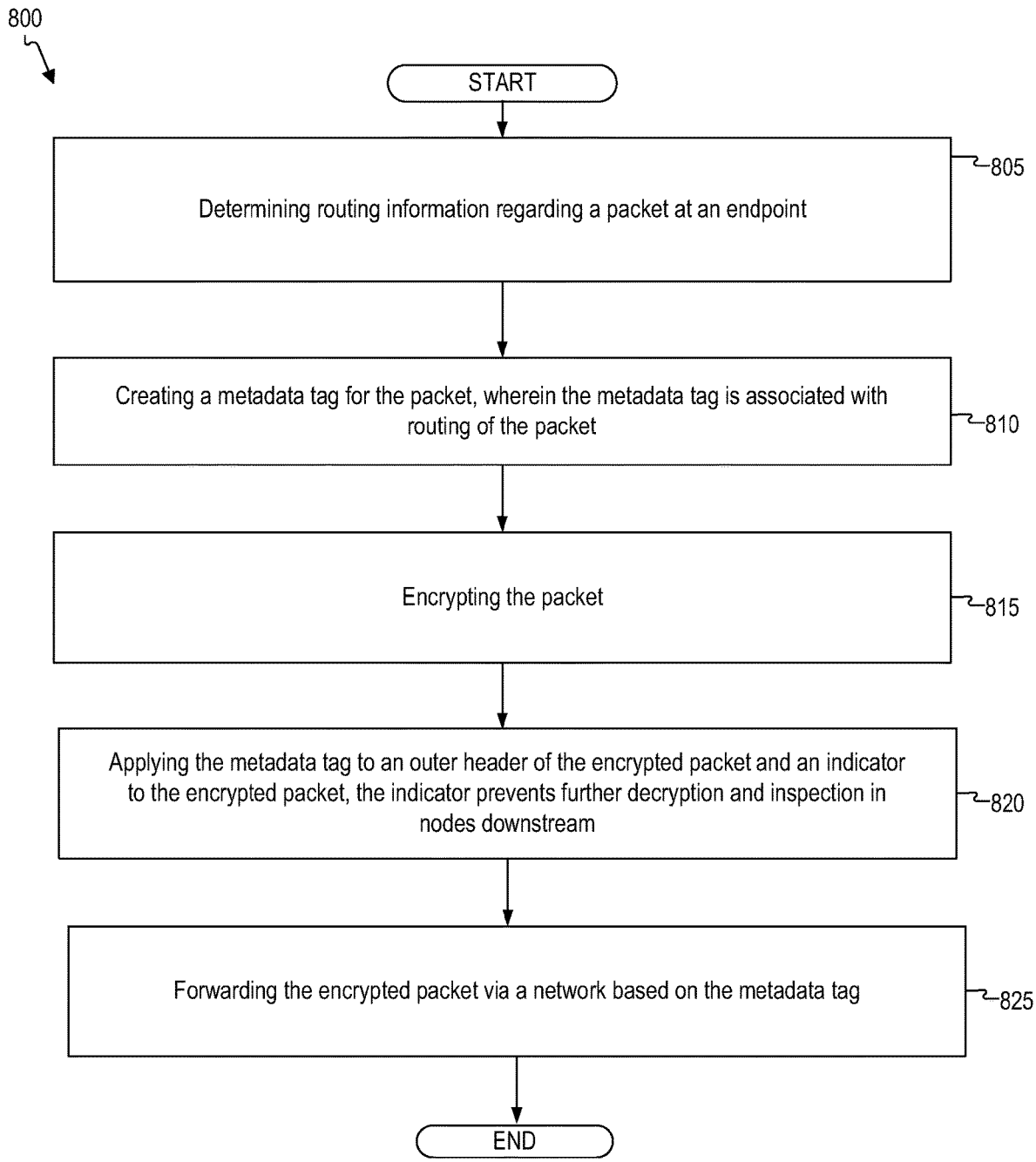
FIG. 8 illustrates an example flow diagram of a process for applying a metadata tag externally to a packet that is then encrypted, in accordance with some aspects of this disclosure.

FIG. 8 illustrates an example flow diagram of a process for applying a metadata tag externally to a packet that is then encrypted, in accordance with some aspects of this disclosure. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method includes determining routing information regarding a packet at an endpoint at block 805. For example, the endpoint 206 illustrated in FIG. 5A may determine routing information regarding a packet at an endpoint.

According to some examples, the method includes creating a metadata tag for the packet at block 810. For example, the endpoint 206 illustrated in FIG. 5A may create a metadata tag for the packet. The metadata tag is associated with routing of the packet.

According to some examples, the method includes encrypting the packet at block 815. For example, the endpoint 206 illustrated in FIG. 5A may encrypt the packet.

According to some examples, the method includes applying the metadata tag to an outer header of the encrypted packet and an indicator to the encrypted packet, the indicator prevents further decryption and inspection in nodes downstream at block 820. For example, the endpoint 206 illustrated in FIG. 5A may apply the metadata tag to an outer header of the encrypted packet and an indicator to the encrypted packet, the indicator prevents further decryption and inspection in nodes downstream. The metadata tag includes contextual information for routing and policy decisions, the contextual information including at least one of a user, a group tag that the user is a part of, a data center tag associated with a data center that the encrypted packet is being routed, and a virtual network identifier.

According to some examples, the method includes forwarding the encrypted packet via a network based on the metadata tag at block 825. For example, the endpoint 206 illustrated in FIG. 5A may forward the encrypted packet via a network based on the metadata tag.

According to some examples, the method includes receiving a second encrypted packet with a second metadata tag. For example, the endpoint 206 illustrated in FIG. 5A may receive a second encrypted packet with a second metadata tag.

According to some examples, the method includes applying an enforcement policy to the second encrypted packet based on the second metadata tag. For example, the endpoint 206 illustrated in FIG. 5A may apply an enforcement policy to the second encrypted packet based on the second metadata tag.

According to some examples, the method includes blocking or further routing the second encrypted packet to a second cloud enforcement node without decrypting the second encrypted packet based on the applied enforcement policy. For example, the endpoint 206 illustrated in FIG. 5A may block or further route the second encrypted packet to a second cloud enforcement node without decrypt the second encrypted packet based on the applied enforcement policy.

According to some examples, the method includes determining, based on the group tag, that the encrypted packet is limited to a particular route. For example, the endpoint 206 illustrated in FIG. 5A may determine, based on the group tag, that the encrypted packet is limited to a particular route.

According to some examples, the method includes performing segmentation of the network, whereby the encrypted packet is limited to the particular route in associated data centers. For example, the endpoint 206 illustrated in FIG. 5A may perform segmentation of the network, whereby the encrypted packet is limited to the particular route in associated data centers.

Figure 9:
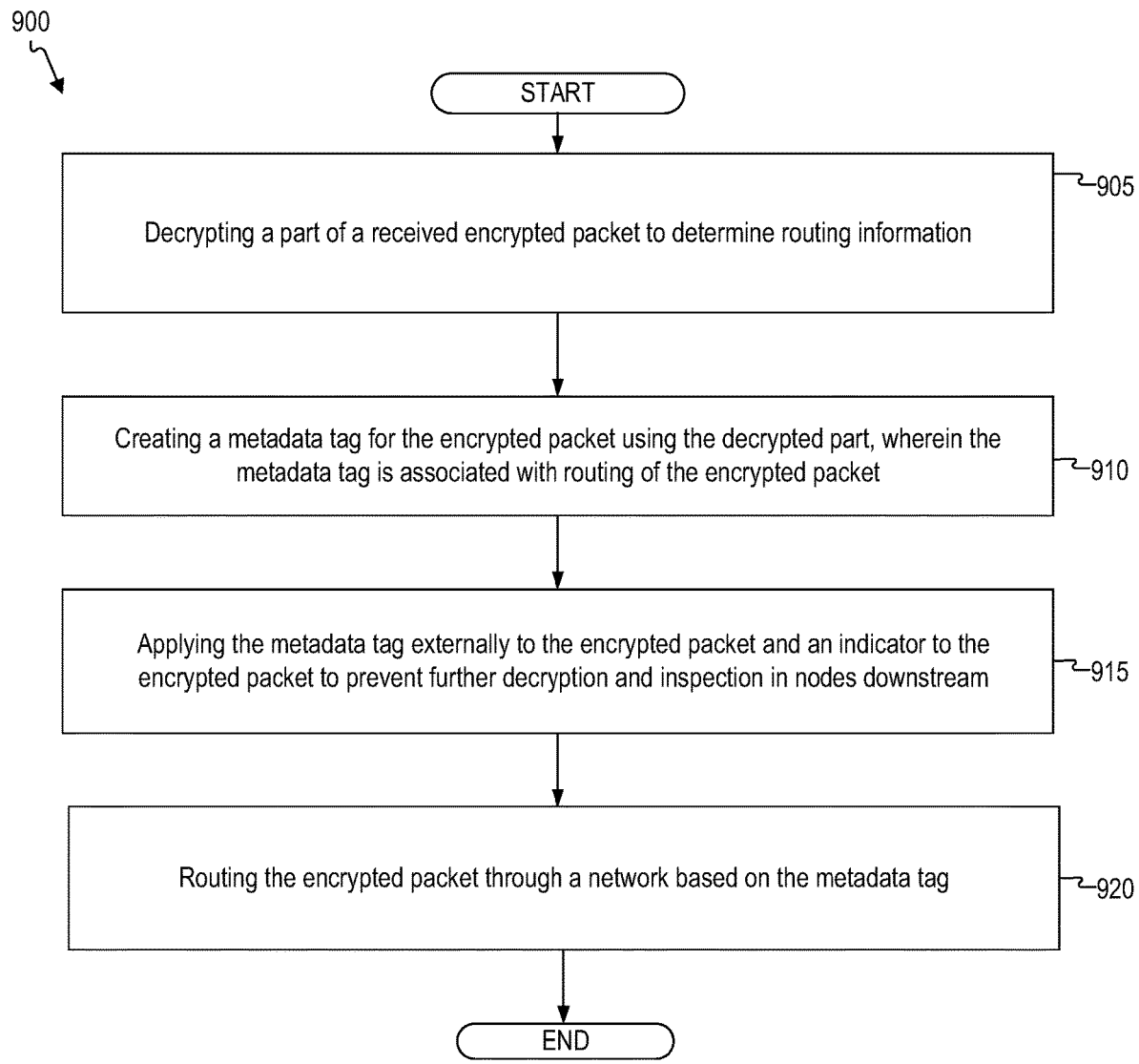
FIG. 9 illustrates an example flow diagram of a process for applying a metadata tag externally to an encrypted packet, in accordance with some aspects of this disclosure.

FIG. 9 illustrates an example flow diagram of a process for applying a metadata tag externally to an encrypted packet, by decrypting a portion of the encrypted packet, in accordance with some aspects of this disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes decrypting a part of a received encrypted packet to determine routing information at block 905. For example, the edge network device 142 illustrated in FIG. 5B may decrypt a part of a received encrypted packet to determine route information.

According to some examples, the method includes creating a metadata tag for the encrypted packet using the decrypted part at block 910. For example, the edge network device 142 illustrated in FIG. 5B may create a metadata tag for the encrypted packet using the decrypted part. The metadata tag is associated with routing of the encrypted packet.

According to some examples, the method includes applying the metadata tag externally to the encrypted packet and an indicator to the encrypted packet to prevent further decryption and inspection in nodes downstream at block 915. For example, the edge network device 142 illustrated in FIG. 5B may apply the metadata tag externally to the encrypted packet and an indicator to the encrypted packet to prevent further decryption and inspection in nodes downstream.

According to some examples, the method includes routing the encrypted packet through a network based on the metadata tag at block 920. For example, the edge network device 142 illustrated in FIG. 5B may route the encrypted packet through a network based on the metadata tag.

According to some examples, the method includes encrypting the metadata tag with a different encryption protocol from an encryption protocol used to encrypt the at least a part of the received packet. For example, the edge network device 142 illustrated in FIG. 5B may encrypt the metadata tag with a different encryption protocol from an encryption protocol used to encrypt the at least a part of the received packet.

According to some examples, the method includes determining that the encrypted packet is to be routed external to the network, whereby the determination causes headers, including the metadata tag, to be encapsulated in an outer (D)TLS tunnel header via (D)TLS encapsulation, the encrypted packet to be encrypted in an inner IPsec tunnel header via IPsec site-to-site. For example, the edge network device 142 illustrated in FIG. 5B may determine that the encrypted packet is to be routed external to the network, whereby the determination causes headers, including the metadata tag, to be encapsulated in an outer (D)TLS tunnel header via (D)TLS encapsulation, the encrypted packet to be encrypted in an inner IPsec tunnel header via IPsec site-to-site.

According to some examples, the method includes bootstrapping an Internet Key Exchange (IKE) on behalf of a client, whereby the client does not have access to a pre-shared key associated with the IPsec site-to-site. For example, the edge network device 142 illustrated in FIG. 5B may bootstrap an Internet Key Exchange (IKE) on behalf of a client, whereby the client does not have access to a pre-shared key associated with the IPsec site-to-site.

According to some examples, the method includes preventing child Security Associations from being decryptable by the network. For example, the edge network device 142 illustrated in FIG. 5B may prevent child Security Associations from be decryptable by the network. The inner IPsec tunnel header is not decryptable by the network.

According to some examples, the method includes applying a different prioritization routing policy to the encrypted packet within a multiplexer IPsec or (D)TLS tunnel to a same IP, without decrypting the encrypted packet. For example, the edge network device 142 illustrated in FIG. 5B may apply a different prioritization route policy to the encrypted packet within a multiplexer IPsec or (D)TLS tunnel to a same IP, without decrypt the encrypted packet. An eXpress Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

Figure 10:
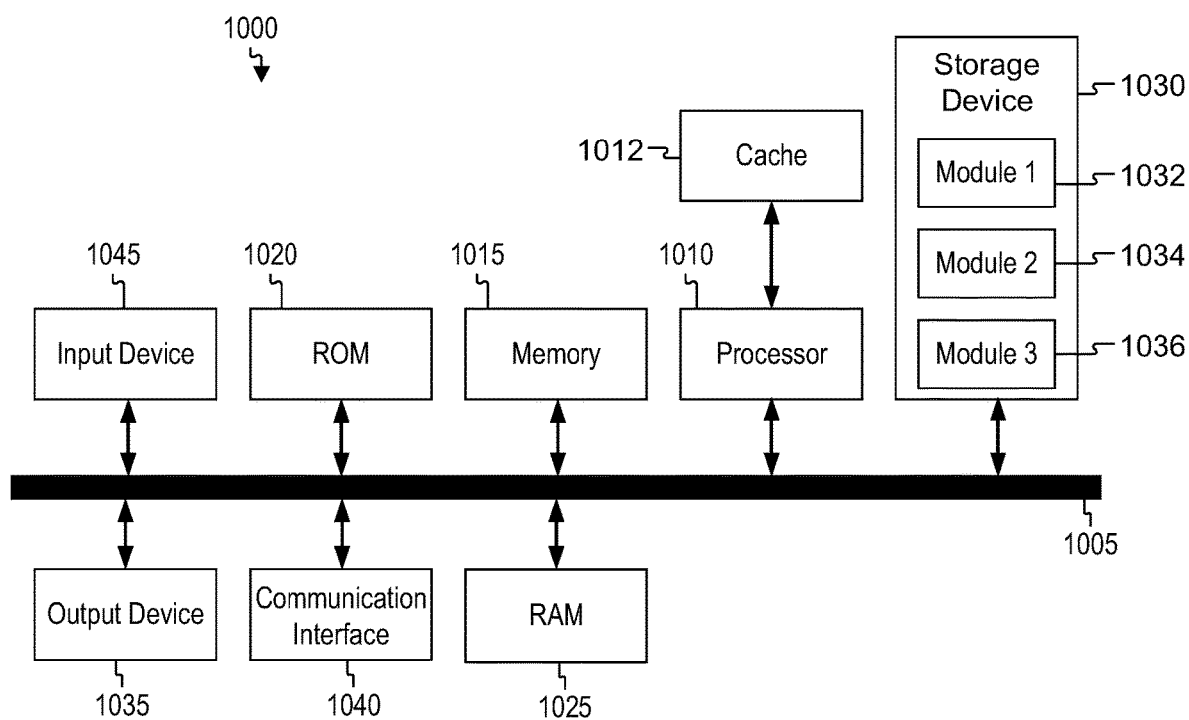
FIG. 10 shows an example of a computing system, in accordance with some aspects of this disclosure.

FIG. 10 shows an example of a computing system, in accordance with some aspects of this disclosure. Connection 1005 can be a physical connection via a bus, or a direct connection into processor 1010, such as in a chipset architecture. Connection 1005 can also be a virtual connection, networked connection, or logical connection. In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: A computer-implemented method including: determining routing information regarding a packet at an endpoint; creating a metadata tag for the packet, wherein the metadata tag is associated with routing of the packet; encrypting the packet; applying the metadata tag to an outer header of the encrypted packet and an indicator to the encrypted packet, the indicator prevents further decryption and inspection in nodes downstream; and forwarding the encrypted packet via a network based on the metadata tag.

Aspect 2: The computer-implemented method of Aspect 1, further comprising: receiving a second encrypted packet with a second metadata tag; applying an enforcement policy to the second encrypted packet based on the second metadata tag; and blocking or further routing the second encrypted packet to a second cloud enforcement node without decrypting the second encrypted packet based on the applied enforcement policy.

Aspect 3: The computer-implemented method of any of Aspects 1 to 2, wherein the metadata tag includes contextual information for routing and policy decisions, the contextual information including at least one of a user, a group tag that the user is a part of, a data center tag associated with a data center that the encrypted packet is being routed, and a virtual network identifier.

Aspect 4: The computer-implemented method of any of Aspects 1 to 3, further comprising: determining, based on the group tag, that the encrypted packet is limited to a particular route; and performing segmentation of the network, whereby the encrypted packet is limited to the particular route in associated data centers.

Aspect 5: A computer-implemented method, comprising: decrypting a part of a received encrypted packet to determine routing information; creating a metadata tag for the encrypted packet using the decrypted part, wherein the metadata tag is associated with routing of the encrypted packet; applying the metadata tag externally to the encrypted packet and an indicator to the encrypted packet to prevent further decryption and inspection in nodes downstream; and routing the encrypted packet through a network based on the metadata tag.

Aspect 6: The computer-implemented method of Aspect 5, further comprising: encrypting the metadata tag with a different encryption protocol from an encryption protocol used to encrypt the at least a part of the received packet.

Aspect 7: The computer-implemented method of any of Aspects 5 to 6, further comprising: determining that the encrypted packet is to be routed external to the network, whereby the determination causes headers, including the metadata tag, to be encapsulated in an outer protocol encapsulation, the encrypted packet to be encrypted in an inner protocol encapsulation.

Aspect 8: The computer-implemented method of any of Aspects 5 to 7, wherein the outer protocol encapsulation is an outer (D)TLS tunnel header via (D)TLS encapsulation and the inner protocol encapsulation is an inner IPsec tunnel header via IPsec site-to-site, the method further comprising: bootstrapping an Internet Key Exchange (IKE) on behalf of a client, whereby the client does not have access to a pre-shared key associated with the IPsec site-to-site; and preventing child Security Associations from being decryptable by the network, wherein the inner IPsec tunnel header is not decryptable by the network.

Aspect 9: The computer-implemented method of any of Aspects 5 to 8, further comprising: applying a different prioritization routing policy to the encrypted packet within a multiplexer IPsecIPsec or (D)TLS(D)TLS tunnel to a same IP, without decrypting the encrypted packet.

Aspect 10: The computer-implemented method of any of Aspects 5 to 9, wherein an eXpress Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

Aspect 11: A device for applying a metadata tag externally to a packet that is then encrypted, comprising: a storage configured to store instructions; a processor configured to execute the instructions and cause the processor to: determine routing information regarding a packet at an endpoint, create a metadata tag for the packet, wherein the metadata tag is associated with routing of the packet, apply the metadata tag to an outer header of the encrypted packet and an indicator to the encrypted packet, the indicator prevents further decryption and inspection in nodes downstream, and forward the encrypted packet via a network based on the metadata tag.

Aspect 12: The device of Aspect 11, wherein the processor is configured to execute the instructions and cause the processor to: receive a second encrypted packet with a second metadata tag; apply an enforcement policy to the second encrypted packet based on the second metadata tag; and block or further route the second encrypted packet to a second cloud enforcement node without decrypt the second encrypted packet based on the applied enforcement policy.

Aspect 13: The device of any of Aspects 11 to 12, wherein the metadata tag includes contextual information for routing and policy decisions, the contextual information including at least one of a user, a group tag that the user is a part of, a data center tag associated with a data center that the encrypted packet is being routed, and a virtual network identifier.

Aspect 14: The device of any of Aspects 11 to 13, wherein the processor is configured to execute the instructions and cause the processor to: determine, based on the group tag, that the encrypted packet is limited to a particular route; and perform segmentation of the network, whereby the encrypted packet is limited to the particular route in associated data centers.

Aspect 15: A device for applying a metadata tag externally to an encrypted packet, comprising: a storage configured to store instructions; a processor configured to execute the instructions and cause the processor to: decrypt a part of a received encrypted packet to determine route information, create a metadata tag for the encrypted packet using the decrypted part, wherein the metadata tag is associated with routing of the encrypted packet, apply the metadata tag externally to the encrypted packet and an indicator to the encrypted packet to prevent further decryption and inspection in nodes downstream, and route the encrypted packet through a network based on the metadata tag.

Aspect 16: The device of Aspect 15, wherein the processor is configured to execute the instructions and cause the processor to: encrypt the metadata tag with a different encryption protocol from an encryption protocol used to encrypt the at least a part of the received packet.

Aspect 17: The device of any of Aspects 15 to 16, wherein the processor is configured to execute the instructions and cause the processor to: determine that the encrypted packet is to be routed external to the network, whereby the determination causes headers, including the metadata tag, to be encapsulated in an outer protocol encapsulation, the encrypted packet to be encrypted in an inner protocol encapsulation.

Aspect 18: The device of any of Aspects 15 to 17, wherein the outer protocol encapsulation is an outer (D)TLS tunnel header via (D)TLS encapsulation and the inner protocol encapsulation is an inner IPsec tunnel header via IPsec site-to-site, wherein the processor is configured to execute the instructions and cause the processor to: bootstrape an Internet Key Exchange (IKE) on behalf of a client, whereby the client does not have access to a pre-shared key associated with the IPsec site-to-site; and prevent child Security Associations from be decryptable by the network, wherein the inner IPsec tunnel header is not decryptable by the network.

Aspect 19: The device of any of Aspects 15 to 18, wherein the processor is configured to execute the instructions and cause the processor to: apply a different prioritization route policy to the encrypted packet within a multiplexer IPsec or (D)TLS tunnel to a same IP, without decrypt the encrypted packet.

Aspect 20: The device of any of Aspects 15 to 19, wherein an eXpress Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

Aspect 21: A non-transitory computer readable medium comprising instructions, the instructions, when executed by a computing system, cause the computing system to: determine routing information regarding a packet at an endpoint; create a metadata tag for the packet, wherein the metadata tag is associated with routing of the packet; apply the metadata tag to an outer header of the encrypted packet and an indicator to the encrypted packet, the indicator prevents further decryption and inspection in nodes downstream; and forward the encrypted packet via a network based on the metadata tag.

Aspect 22: The computer readable medium of Aspect 21, wherein the computer readable medium further comprises instructions that, when executed by the computing system, cause the computing system to: receive a second encrypted packet with a second metadata tag; apply an enforcement policy to the second encrypted packet based on the second metadata tag; and block or further route the second encrypted packet to a second cloud enforcement node without decrypt the second encrypted packet based on the applied enforcement policy.

Aspect 23: The computer readable medium of any of Aspects 21 to 22, the metadata tag includes contextual information for routing and policy decisions, the contextual information including at least one of a user, a group tag that the user is a part of, a data center tag associated with a data center that the encrypted packet is being routed, and a virtual network identifier.

Aspect 24: The computer readable medium of any of Aspects 21 to 23, wherein the computer readable medium further comprises instructions that, when executed by the computing system, cause the computing system to: determine, based on the group tag, that the encrypted packet is limited to a particular route; and perform segmentation of the network, whereby the encrypted packet is limited to the particular route in associated data centers.

Aspect 25: A non-transitory computer readable medium comprising instructions, the instructions, when executed by a computing system, cause the computing system to: decrypt a part of a received encrypted packet to determine route information; create a metadata tag for the encrypted packet using the decrypted part, wherein the metadata tag is associated with routing of the encrypted packet; apply the metadata tag externally to the encrypted packet and an indicator to the encrypted packet to prevent further decryption and inspection in nodes downstream; and route the encrypted packet through a network based on the metadata tag.

Aspect 26: The computer readable medium of Aspect 25, wherein the computer readable medium further comprises instructions that, when executed by the computing system, cause the computing system to: encrypt the metadata tag with a different encryption protocol from an encryption protocol used to encrypt the at least a part of the received packet.

Aspect 27: The computer readable medium of any of Aspects 25 to 26, wherein the computer readable medium further comprises instructions that, when executed by the computing system, cause the computing system to: determine that the encrypted packet is to be routed external to the network, whereby the determination causes headers, including the metadata tag, to be encapsulated in an outer protocol encapsulation, the encrypted packet to be encrypted in an inner protocol encapsulation.

Aspect 28: The computer readable medium of any of Aspects 25 to 27, wherein the outer protocol encapsulation is an outer (D)TLS tunnel header via (D)TLS encapsulation and the inner protocol encapsulation is an inner IPsec tunnel header via IPsec site-to-site, and wherein the computer readable medium further comprises instructions that, when executed by the computing system, cause the computing system to: bootstrap an Internet Key Exchange (IKE) on behalf of a client, whereby the client does not have access to a pre-shared key associated with the IPsec site-to-site; and prevent child Security Associations from be decryptable by the network, wherein the inner IPsec tunnel header is not decryptable by the network.

Aspect 29: The computer readable medium of any of Aspects 25 to 28, wherein the computer readable medium further comprises instructions that, when executed by the computing system, cause the computing system to: apply a different prioritization route policy to the encrypted packet within a multiplexer IPsec or (D)TLS tunnel to a same IP, without decrypt the encrypted packet.

Aspect 30: The computer readable medium of any of Aspects 25 to 29, an eXpress Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

What is claimed is:

1. A computer-implemented method, comprising:
   decrypting a part of a received encrypted packet to determine routing information to yield a decrypted part and a remaining encrypted part that includes a payload, the remaining encrypted part being encrypted in an inner IPsec tunnel header via IPsec site-to-site;
   creating a metadata tag for the encrypted packet using the decrypted part, wherein the metadata tag includes a hint associated with the routing information of the encrypted packet;
   encrypting the metadata tag with a different encryption protocol from an encryption protocol used to encrypt the remaining encrypted part;
   upon encrypting the metadata tag, applying the metadata tag externally to an outer header of the encrypted packet, wherein the metadata tag is encapsulated in an outer (D)TLS tunnel header via (D)TLS encapsulation; and applying an indicator to the encrypted packet, the indicator preventing further decryption and inspection of the remaining encrypted part at nodes downstream;
bootstrapping an Internet Key Exchange (IKE) on behalf of a client, whereby the client does not have access to a pre-shared key associated with the IPsec site-to-site;
preventing child Security Associations from being decryptable by a network, wherein the inner IPsec tunnel header is not decryptable by the network; and
routing the remaining encrypted part through the network based on the metadata tag.

2. The computer-implemented method of claim 1 further comprising:
determining that the encrypted packet is to be routed external to the network, whereby the determination causes headers to be encapsulated in the outer (D)TLS tunnel header via (D)TLS encapsulation and the remaining encrypted part to be encrypted in the inner IPsec tunnel header via IPsec site-to-site.

3. The computer-implemented method of claim 1, further comprising:
applying a different prioritization routing policy to the encrypted packet within a multiplexer IPsec or (D)TLS tunnel to a same IP, without decrypting the encrypted packet.

4. The computer-implemented method of claim 1, wherein an express Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

5. A device for applying a metadata tag externally to an encrypted packet, comprising:
a memory configured to store computer-readable instructions; and
a processor configured to execute the computer-readable instructions to:
decrypt a part of a received encrypted packet to determine routing information to yield a decrypted part and a remaining encrypted part that includes a payload, the remaining encrypted part being encrypted in an inner IPsec tunnel header via IPsec site-to-site;
create a metadata tag for the encrypted packet using the decrypted part, wherein the metadata tag includes a hint associated with the routing information of the encrypted packet;
encrypt the metadata tag with a different encryption protocol from an encryption protocol used to encrypt the remaining encrypted part;
upon encrypting the metadata tag, apply the metadata tag externally to an outer header of the encrypted packet, wherein the metadata tag is encapsulated in an outer (D)TLS tunnel header via (D)TLS encapsulation;
apply an indicator to the encrypted packet to prevent further decryption and inspection of the remaining encrypted part at nodes downstream;
bootstrap an Internet Key Exchange (IKE) on behalf of a client, whereby the client does not have access to a pre-shared key associated with the IPsec site-to-site;
prevent child Security Associations from being decryptable by a network, wherein the inner IPsec tunnel header is not decryptable by the network; and
route the remaining encrypted part through the network based on the metadata tag.

6. The device of claim 5, wherein the processor is configured to execute the computer-readable instructions to:
determine that the encrypted packet is to be routed external to the network, whereby the determination causes headers to be encapsulated in the outer (D)TLS tunnel header via (D)TLS encapsulation and the remaining encrypted part to be encrypted in the inner IPsec tunnel header via IPsec site-to-site.

7. The device of claim 5, wherein the processor is configured to execute the computer-readable instructions to:
apply a different prioritization route policy to the encrypted packet within a multiplexer IPsec or (D)TLS tunnel to a same IP, without decrypting the encrypted packet.

8. The device of claim 5, wherein an express Data Path or Extended Berkeley Packet Filter serves as both a metadata engine that creates and applies the metadata tag at an endpoint and a policy application engine that applies polices set forth in the metadata tag to properly route the encrypted packet without decrypting the encrypted packet at an edge network device.

9. A non-transitory computer readable medium comprising computer-readable instructions, which when executed by a computing system, cause the computing system to:
decrypt a part of a received encrypted packet to determine route information to yield a decrypted part and a remaining encrypted part that includes a payload, the remaining encrypted part being encrypted in an inner IPsec tunnel header via IPsec site-to-site;
create a metadata tag for the encrypted packet using the decrypted part, wherein the metadata tag includes a hint associated with routing of the encrypted packet;
encrypt the metadata tag with a different encryption protocol from an encryption protocol used to encrypt the remaining encrypted part;
upon encrypting the metadata tag, apply the metadata tag externally to an outer header of the encrypted packet, wherein the metadata tag is encapsulated in an outer (D)TLS tunnel header via (D)TLS encapsulation;
apply an indicator to the encrypted packet to prevent further decryption and inspection of a remaining encrypted part of the encrypted packet that includes a payload in nodes downstream;
bootstrap an Internet Key Exchange (IKE) on behalf of a client, whereby the client does not have access to a pre-shared key associated with the IPsec site-to-site;
prevent child Security Associations from being decryptable by a network, wherein the inner IPsec tunnel header is not decryptable by the network; and
route the encrypted part through the network based on the metadata tag.

10. The computer readable medium of claim 9, wherein the computer readable medium further comprises computer-readable instructions, which when executed by the computing system, cause the computing system to:
determine that the encrypted packet is to be routed external to the network, whereby the determination causes headers to be encapsulated in the outer (D)TLS tunnel header via (D)TLS encapsulation and the remaining encrypted part to be encrypted in the inner IPsec tunnel header via IPsec site-to-site.

* * * * *